Dec. 30, 1924.
A. G. CANBY
AUTOMOBILE TOP
Filed April 23, 1917       2 Sheets-Sheet 1
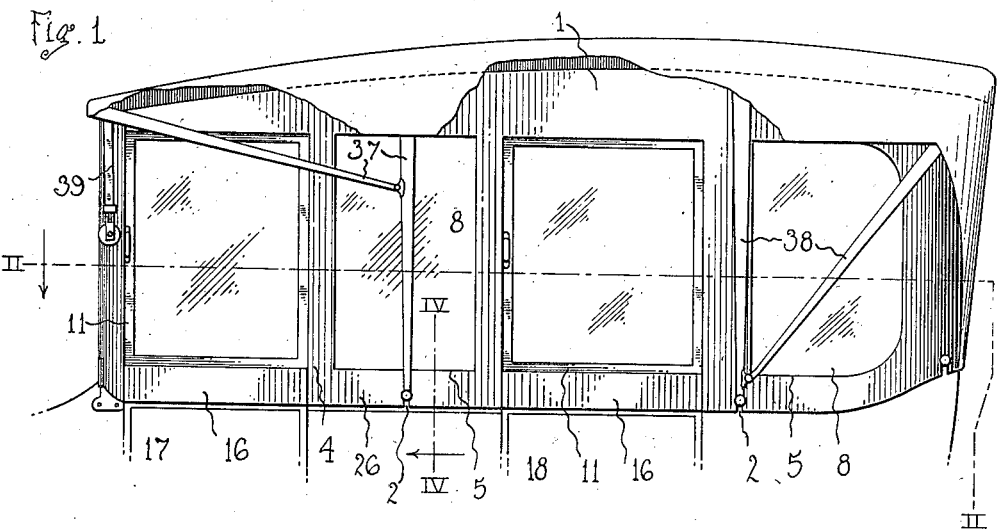
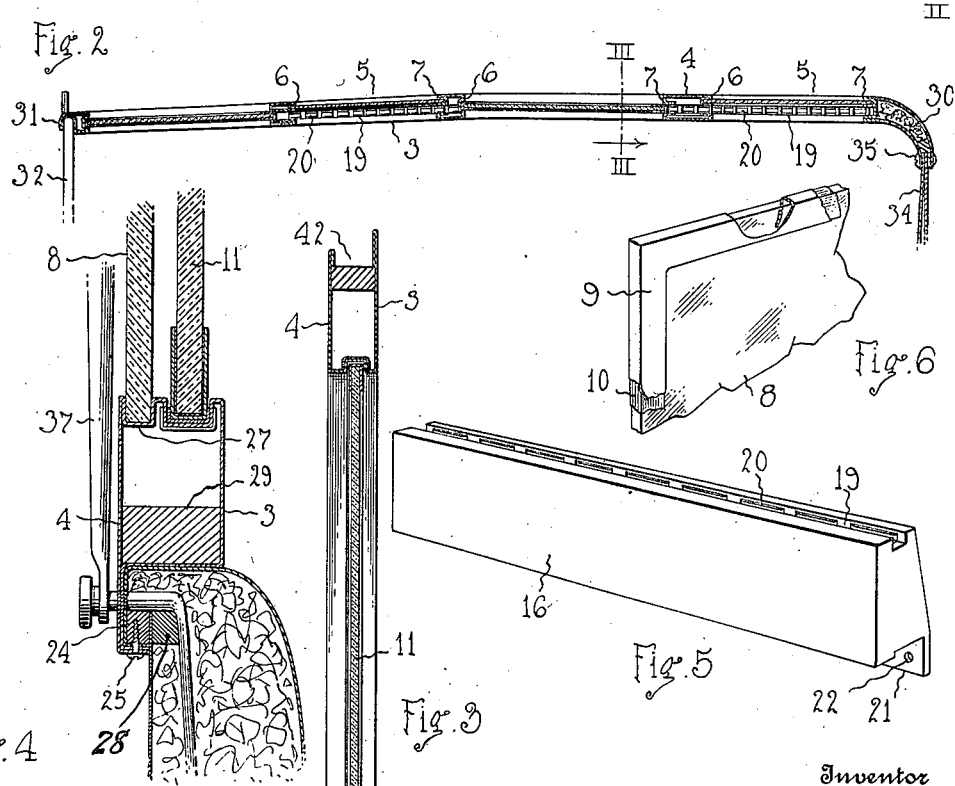

Dec. 30, 1924.
A. G. CANBY
AUTOMOBILE TOP
Filed April 23, 1917    2 Sheets-Sheet 2
1,521,073
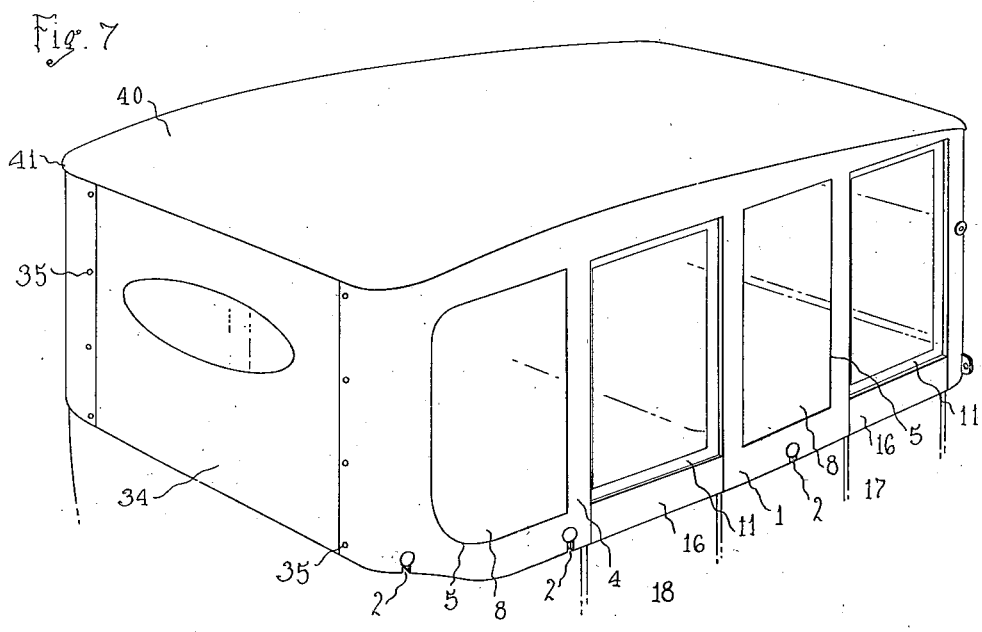
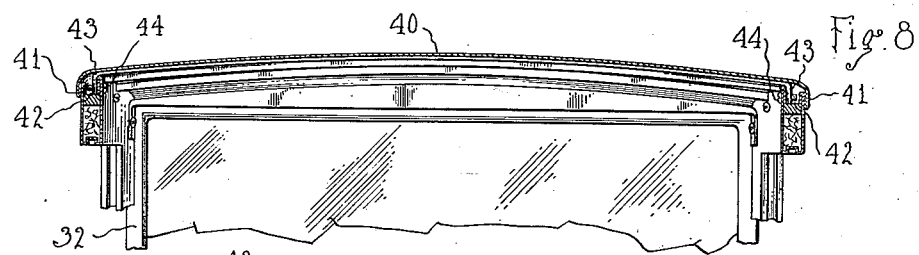
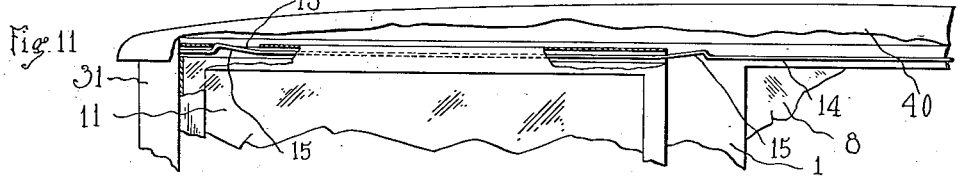
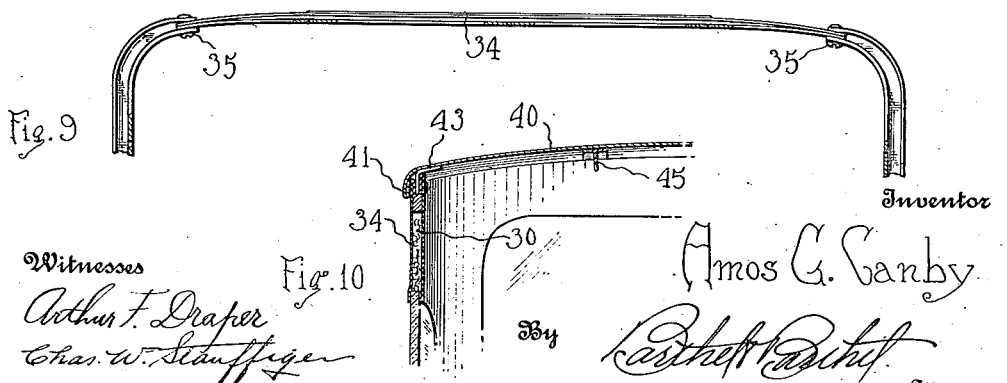
Witnesses
Arthur F. Draper
Chas. W. Stauffger
Inventor
Amos G. Canby
By
Attorneys Patented Dec. 30, 1924.

1,521,073

UNITED STATES PATENT OFFICE.

AMOS G. CANBY, OF DETROIT, MICHIGAN.

AUTOMOBILE TOP.

Application filed April 23, 1917. Serial No. 163,855.

*To all whom it may concern:*

Be it known that I, AMOS G. CANBY, a citizen of the United States of America, residing at Detroit, in the county of Wayne and State of Michigan, have invented certain new and useful Improvements in Automobile Tops, of which the following is a specification, reference being had therein to the accompanying drawings.

This invention relates to a removable upper body for motor vehicles and to an arrangement thereof whereby, if desired, the usual collapsible top of a touring car may be utilized while at the same time the full effects of a permanently enclosed body are obtained. Furthermore the structure has the further advantage of permitting the use of a fixed top so that a full enclosed body is obtained. Another advantage is the flush appearance obtained by the method of construction which combines great strength with lightness and simplicity.

The invention consists in the matters hereinafter set forth, and more particularly pointed out in the appended claims.

In the drawings,

Figure 1 is a view in side elevation of a vehicle equipped with an upper body embodying features of the invention, with a collapsible top used in combination therewith, the latter being partially broken away to give clear view;

Fig. 2 is a view in section taken on or about line II—II of Fig. 1;

Fig. 3 is a view in section taken on or about line III—III of Fig. 2 considerably enlarged;

Fig. 4 is a view in section taken on or about line IV—IV of Fig. 1;

Fig. 5 is a view in detail of a rail applied to the top of the door;

Fig. 6 is a view in detail of a window sash;

Fig. 7 is a view in perspective showing a body provided with a non-collapsible or permanent top;

Fig. 8 is a view in transverse section taken through the top adjacent the windshield and showing the connection with the windshield frame;

Fig. 9 is a horizontal section taken through the back panel of the body showing the connection of the back and side sections;

Fig. 10 is a view in section and detail showing a corner construction with connection of the top and body, and Fig. 11 is a view in detail of a sash slide bar.

As herein indicated in preferred form, a pair of side sections 1, that conform along their lower edges to the vehicle body and are notched as at 2 to rest on the top irons of the body, are formed of an inner metal plate 3 and a corresponding plate 4 that are respectively stamped or pressed out of sheet metal. At the window openings 5 their margins are infolded as indicated at 6 and 7 to provide for the reception of window glass 8; the margins of which are preferably gripped in a sheet metal one piece frame 9 that is channel in section, a strip of felt 10 or like anti-rattling material being used. As these glasses are adjacent door openings they are set forward to permit the passage behind them of door frames 11 built similar to the sashes 9 and carrying door panes. The upper portion, however, of each frame is preferably provided with upwardly extending ears 13 traveling on guide bars 14 inserted between the sides of the main panel, off-set portions 15 of the bar acting as stops to limit the motion of the sash.

A track bar 16 is secured on the top of the regular body door 17 at the front part of the car and the tonneau door 18, if such there be, to hold the door sash 11 in position when the door is closed. Preferably the member 16 is formed of sheet metal with an upper channel 19 having regularly slotted side walls, through the openings of which anti-rattling strips 20 of felt or the like are threaded to hold the sash in position. The lower marginal portion of the member 16 is rabbeted to rest on the door and has an inner depending flange 21 with bolt holes 22 therethrough whereby the rail may be conveniently attached to the door.

The connection between the main panel or side section and the body may be made as indicated in Fig. 4 by carrying the offset and superposed outer plate 4 and inner plate 3 down around a combing strip or mold 24 of the body with fastening screws 25 passed upwardly through the inturned marginal portions. The portions 26 of the side panels which span the space between the doors are not only grooved or inset as indicated at 27 on Fig. 4, to receive the glass 8, which may not, as shown in Fig. 4, have any sash, but are also grooved to form the lower guide for the adjacent door panel, and if desired there may be a reinforcing bar 28. It is to be understood that the interval between the inner and outer plates of each section is maintained not only by insetting of the marginal portions of each sheet around the door and window openings, but also by the interposition of suitable spacing bars 29 of wood or the like, while if preferred, a filling material 30 see Fig. 2, may be added. At the forward end of the sections each is formed, as indicated at 31, to embrace the windshield frame 32 of the vehicle. At the rear, a back panel or section 34, which is likewise formed of inner and outer sheets, is detachably secured at the margins to the side sections, preferably by inserting the contacting section sheets and securing them by wagon bolts 35 (see Fig. 9) or like suitable means.

The body is so designed as to lie wholly within the bows 37 and 38 of the regular top whereby the latter may be used to complete the full enclosure, as indicated in Fig. 1, holding devices 39 securing the front bow part to the forward portions of the side sections, such devices being of any preferred form.

A permanent top 40 is also provided in the form of a pressed sheet metal plate having margins 41 adapted to telescope over the upper rabbeted margins 42 of the side sections while angle bars 43 on the interior of the top together with screws or carriage bolts 44 form means for anchoring the top to the inner margins of the rabbeted sides. Suitable stiffening bars 45 are also provided.

As a result of this construction a knock down body is provided that is extremely light and rigid, that is rigidly secured on a touring car body without disturbance of the regular top which can be used to complete it. Or, if desired, the collapsible top may be removed and the regular top substituted for heavy weather use. The flush lines of the body proper are carried out by the substantially seamless or one piece construction of the part the only seams being between the sides and rear panel and the side sections and windshield frame. Because of the side movement of the door sash into the adjacent panels of the body, the doors are readily operated and there is no necessity of special fitting of the upper or added door sash to insure seam proof joints. In addition to the rigidity and lightness of construction there is an elimination of any rattling as there are no joints to work loose and the frames or sash are yieldingly gripped by the felt lined guiding parts on which they move.

Obviously, changes in the details of construction may be made without departing from the spirit of my invention and I do not care to limit myself to any particular form or arrangement of parts.

What I claim is:—

1. A removable top for motor vehicles, comprising an assembly of side and end panel sections each formed of inner and outer metal plates secured by their margins and having openings provided therein for windows, means for detachably connecting the panels at their meeting edges, and means for closing the spaces over the doors of the regular body, said means including sash adapted to telescope into the side panels, and sheet metal guide members for the sash detachably securable to the inner side of the door and adapted to seat on the top of the door, said guide members each being of a length equal to the width of the door by which it is carried and having a substantially uniform vertical dimension throughout the length of the member, the dimensions of each sash being such as to produce a distance between the advance and rear edges of the sash greater than the length of the guide member, said advance and rear edges of the sash being bounded by the panel section assembly when the sash is in position to close the space above its door-carried guide member.

2. A removable upper body for motor vehicles comprising a pair of side sections formed of an inner sheet metal piece and an outer sheet metal piece secured in spaced relation and provided with sash guides over openings cut therethrough to conform to the doors of the vehicle, a sash for these openings slidable on the guiding means, sheet metal guiding members adapted to be detachably mounted on the regular vehicle doors of the body for receiving the lower edge of the sash when in space-closing position, said guiding members each being of a length equal to the width of the door by which it is carried and having a substantially uniform vertical dimension throughout the length of the member and being secured on the inner side of the door and located to seat on the top of the door, end panels for the body adapted to be detachably secured to the sash sections and each formed of an inner and outer metal plate secured together in spaced relation, and means for securing a top over the assembled side and end sections, the dimensions of each sash being such as to produce a distance between the advance and rear edges of the sash greater than the length of the guide member, said advance and rear edges of the sash being bounded by the walls of the openings of the assembled side sections when the sash is in position to close the space above its door-carried guide member.

3. A removable upper body for motor vehicles comprising side sections each formed of an inner metal plate, an outer metal plate, means for securing the plates in spaced relation, said plate assembly having openings to conform to the sides and top of the door openings of the vehicle, said openings of the plate assembly being free from a bottom boundary within the plate assembly, guide means detachable from and carried by the doors and positioned to complete the boundary of said openings when the doors are closed, said guide means being individual to the door and having a length equal to the width of the door and of a substantially uniform vertical dimension throughout he length of such means, said guide means being of sheet metal, a sash slidable on the guide means and adapted to be telescoped into the plate-assembly side sections, guiding means for the sash at the top of the opening, the dimensions of each sash being such as to produce a distance between the advance and rear edges of the sash greater than the length of the guide means on the door, said advance and rear edges of the sash being bounded by the panel assembly of the side sections when the sash is in position to close the space above its door-carried guide means, front and back end sections formed of an inner sheet metal plate and an outer sheet metal plate secured in spaced relation, the end sections being adapted to detachably engage with the side sections and form thereby a substantially water tight joint, and means for securing a removable top over the assembled sections.

4. In a vehicle having a detachable top, a removable upper body consisting of a pair of side sections each formed of an inner plate and an outer plate secured in spaced relation and provided with openings over the regular body doors of the vehicle, said plate-assembly sections being arranged to be supported on the regular top irons of the body, sash guides mounted on said plate-assembly sections at the top of the door openings, a sash slidable relative to the door openings for telescoping into the sections, sheet metal guiding means for and located below the sash travel path and adapted to be detachably mounted on the doors of the vehicle, each door having its individual guiding means, each of such guiding means being secured on the inner side of the door and adapted to seat upon the top of the door with each having a length equal to the width of the door by which it is carried and having a substantially uniform vertical dimension throughout such means length, the dimensions of each sash being such as to produce a distance between the advance and rear edges of the sash greater than the length of the individual guiding means with which it co-operates, said advance and rear edges of the sash being bounded by the walls of the openings of the plate assembly sections when the sash is in position to close the space above its door-carried guiding means, front and back end sections each consisting of an inner single plate and an outer single plate secured in spaced relation, the marginal portions of the end sections being adapted to be detachably interlocked with the marginal portions of the body sections, and means for securing the collapsible top to and over the frame assembly.

5. A removable top for automobiles comprising a plate assembly adapted to be removably secured to the automobile body, said assembly including independent sheet metal members removably secured to and movable with the body doors and adapted to form the lower wall of an opening formed in the plate assembly above each door of the automobile when the door is closed, said members each being of a length equal to the width of the door by which it is carried and having a substantially uniform vertical dimension throughout the length of the member, the several members forming guides for sash structures slidable to and from positions to close the openings above the members, said members being free from direct connection with the frame assembly and each having a sash-receiving and guiding groove of equal width from end to end with the groove positioned in correspondence with the plane of sliding movement of the sash structure with which it co-operates, each sash structure having dimensions such as to produce a distance between its advance and rear edges greater than the length of the door-carried member with which it co-operates, such advance and rear edges of the sash structure being bounded by the plate-assembly walls of the opening when the sash structure is in position to close such opening.

In testimony whereof I affix my signature in the presence of two witnesses.

AMOS G. CANBY.

Witnesses:
ANNA M. DORR,
G. E. MCGRANN.